(12) United States Patent
Hwang

(10) Patent No.: US 9,599,492 B2
(45) Date of Patent: Mar. 21, 2017

(54) MOBILE DEVICE AND METHOD FOR CONTROLLING SENSOR BY THE MOBILE DEVICE

(71) Applicant: FUTUREPLAY INC., Seoul (KR)

(72) Inventor: Sungjae Hwang, Seoul (KR)

(73) Assignee: FUTUREPLAY INC., Seoul (KR)

(*) Notice: Subject to any disclaimer, the term of this patent is extended or adjusted under 35 U.S.C. 154(b) by 0 days.

(21) Appl. No.: 14/937,897

(22) Filed: Nov. 11, 2015

(65) Prior Publication Data

US 2016/0269999 A1    Sep. 15, 2016

Related U.S. Application Data

(63) Continuation of application No. 14/862,164, filed on Sep. 23, 2015, now abandoned, which is a continuation of application No. PCT/KR2015/008637, filed on Aug. 19, 2015.

(30) Foreign Application Priority Data

Mar. 13, 2015  (KR) .................. 10-2015-0035305

(51) Int. Cl.
*G01D 21/00* (2006.01)
*H04M 1/725* (2006.01)
*H04W 4/00* (2009.01)
*H04W 52/02* (2009.01)
*G05B 19/10* (2006.01)

(52) U.S. Cl.
CPC ........... *G01D 21/00* (2013.01); *G05B 19/106* (2013.01); *H04M 1/72533* (2013.01); *H04W 4/006* (2013.01); *H04W 4/008* (2013.01); *H04W 52/0261* (2013.01); *H04W 52/0274* (2013.01); *G05B 2219/25202* (2013.01)

(58) Field of Classification Search
CPC . G01D 21/00; G05B 19/106; H04M 1/72533; H04W 4/006; H04W 4/008; H04W 52/0261; H04W 52/0274
See application file for complete search history.

(56) References Cited

U.S. PATENT DOCUMENTS

| 8,669,864 | B1 | 3/2014 | Tedesco et al. |
| 2010/0082983 | A1 | 4/2010 | Shah et al. |
| 2012/0271471 | A1 | 10/2012 | Lee et al. |
| 2014/0172132 | A1 | 6/2014 | Ura |
| 2016/0021617 | A1* | 1/2016 | Hsiao ................ H04W 52/0277 455/456.6 |

FOREIGN PATENT DOCUMENTS

| JP | 2014-117551 A | 6/2014 |
| KR | 10-2012-0008376 A | 1/2012 |
| KR | 10-2013-0038756 A | 4/2013 |

* cited by examiner

*Primary Examiner* — Paul D Lee
*Assistant Examiner* — Mark Crohn
(74) *Attorney, Agent, or Firm* — Revolution IP, PLLC

(57) ABSTRACT

A method for controlling a sensor by a mobile device, the method comprising: executing an application performing a task; obtaining first sensor data using a first sensor to perform the task; receiving second sensor data obtained using a second sensor of at least one communicably connected external device; comparing the first sensor data with the second sensor data; and when the first sensor data is replaceable with the second sensor data, controlling an operation of the first sensor and the second sensor according to a battery state of the mobile device and the external device.

13 Claims, 14 Drawing Sheets

FIG. 2
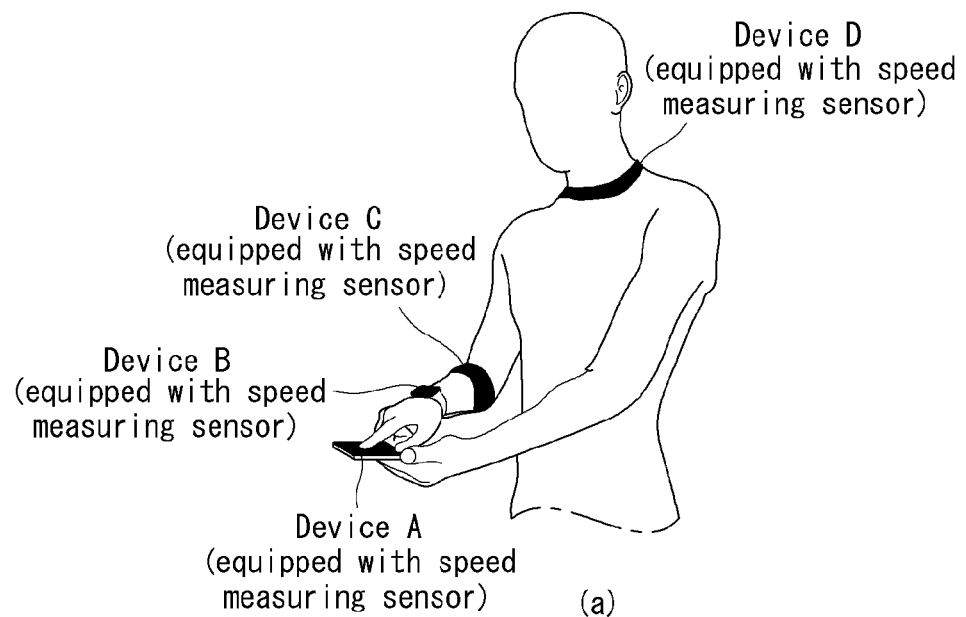
(a)
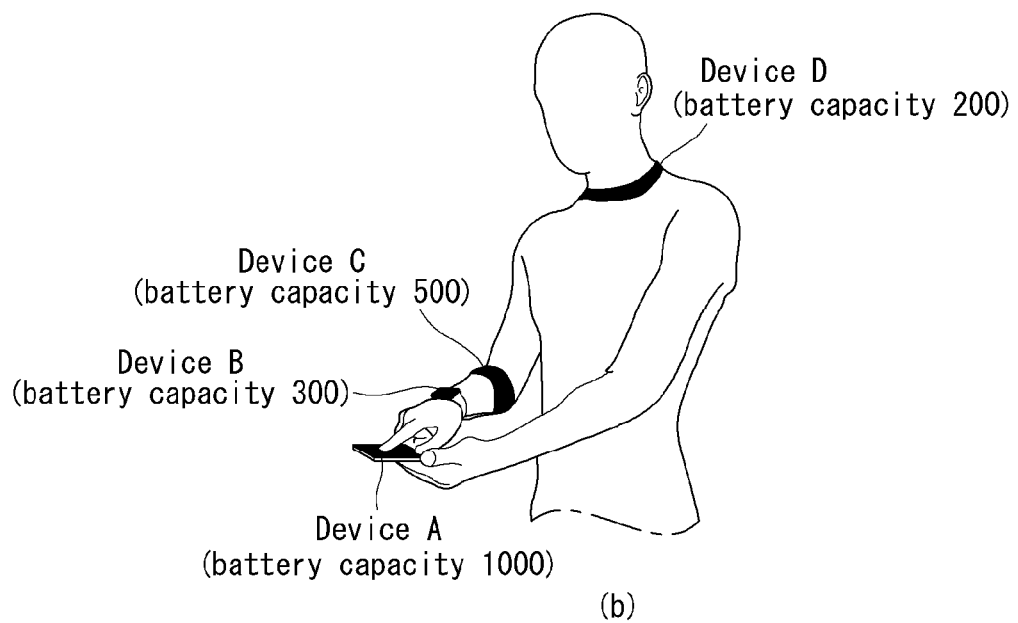
(b)

FIG. 3
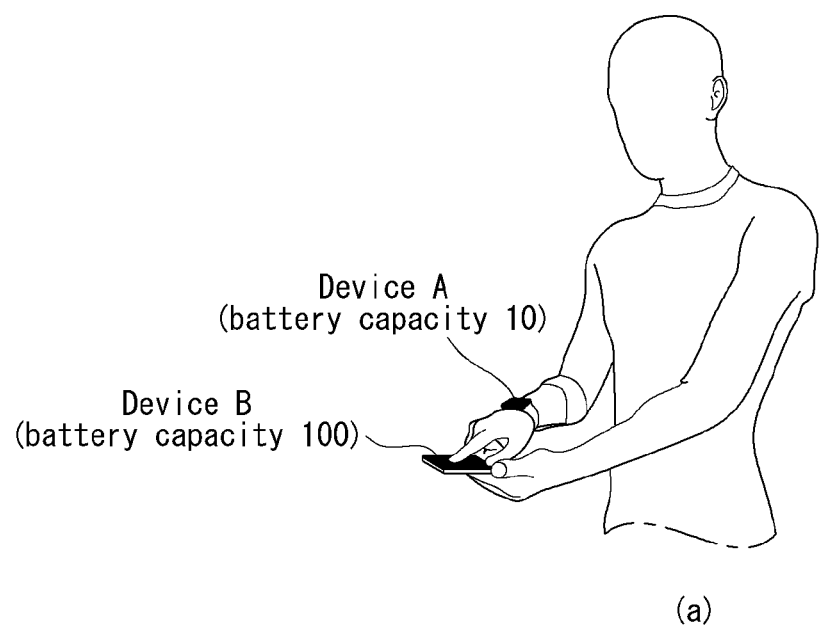
(a)
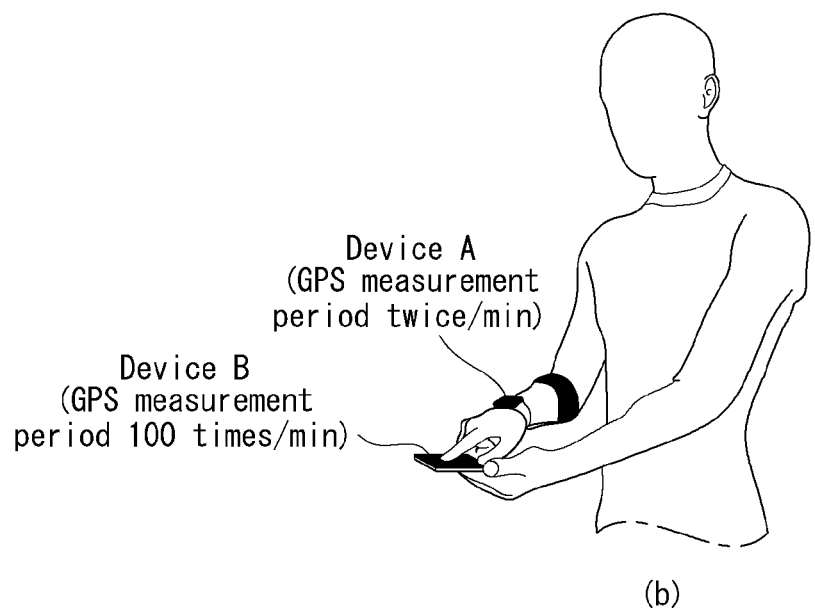
(b)

FIG. 4
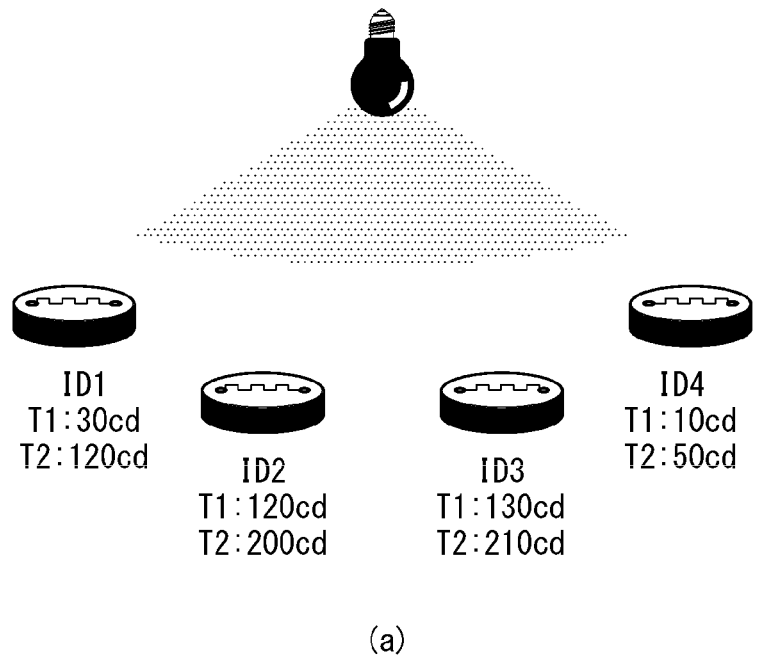
(a)
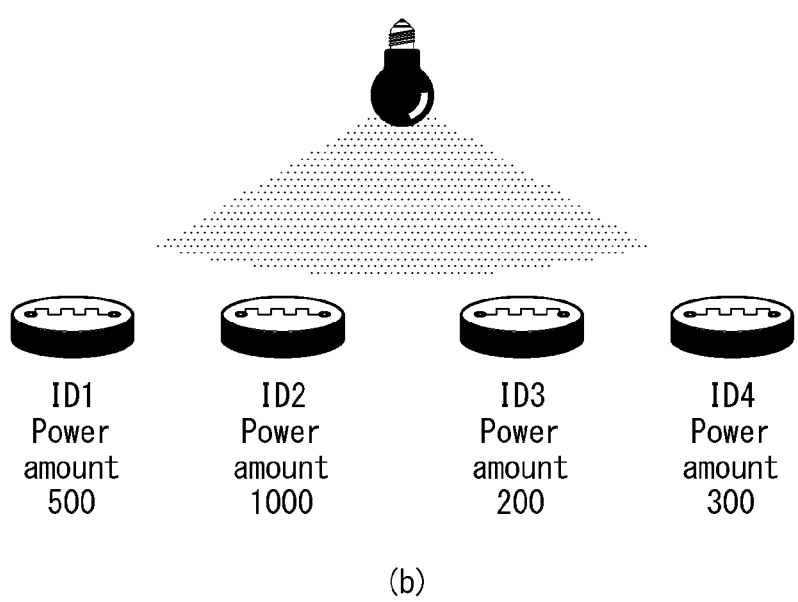
(b)

FIG. 10
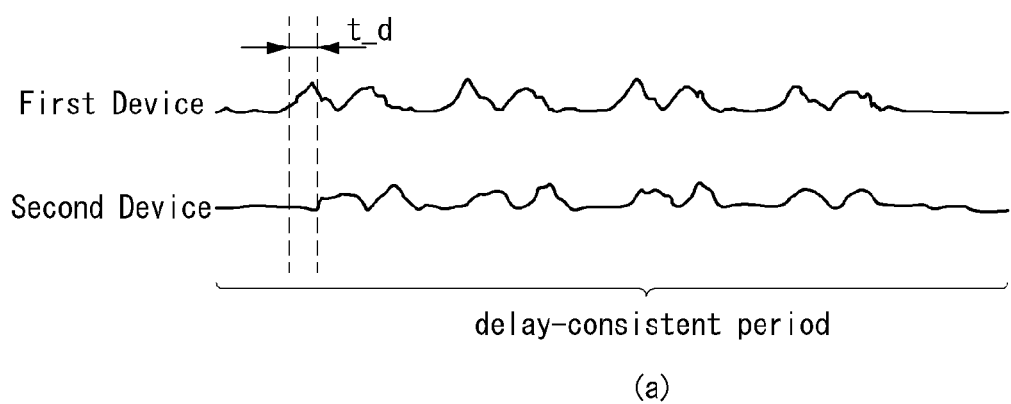
(a)
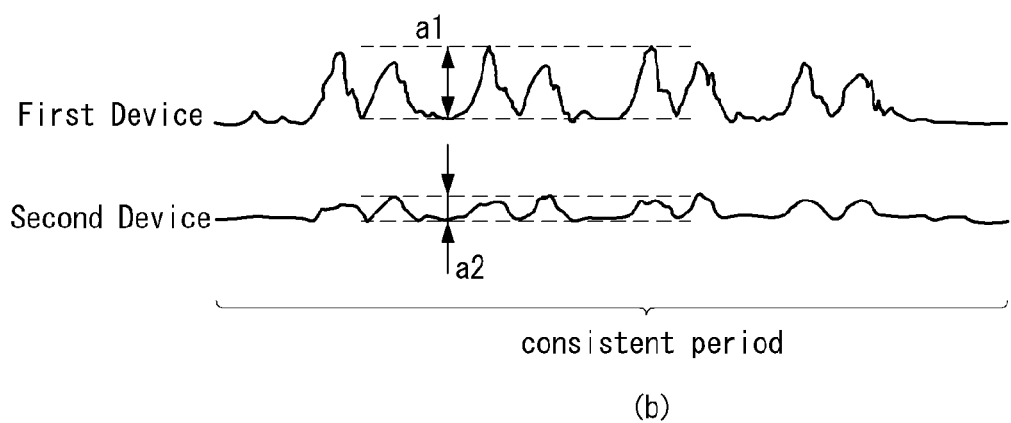
(b)

MOBILE DEVICE AND METHOD FOR CONTROLLING SENSOR BY THE MOBILE DEVICE

CROSS-REFERENCE TO RELATED APPLICATIONS

This U.S. non-provisional patent Application is a Continuation of U.S. patent application Ser. No. 14/862,164 filed Sep. 23, 2015, which is a Continuation of PCT/KR2015/008637 filed Aug. 19, 2015, which claims priority to Korean Patent Application No. 10-2015-0035305 filed Mar. 13, 2015, the entire contents of which are all hereby incorporated by reference.

BACKGROUND

The present invention relates to mobile devices and methods for controlling sensors by the mobile devices, and more particularly, to methods for efficiently managing battery by controlling the use of sensors of a mobile device and an external device when sensor data of the mobile device and sensor data of the external device are replaceable.

As small-sized mobile devices such as laptop computers or smart pads come to the market, smart glasses, smartwatches, smart rings, smart necklaces, smart bands, or other wearable devices are commercially available as well. Further, the spread of miniaturized sensors and communication chips enabled the era of Internet of Things (IoT) by which various devices may collect or communicate data. However, there is no remarkable development in batteries for electronic devices. As wearable devices come in smaller size and are being worn longer, the battery management comes to a critical issue.

SUMMARY

As various devices are equipped with sensors and communication chips, there are more overlapping sensed data. However, such overlapping sensing leads to the waste of resources. Multiple devices need to prevent battery consumption to perform the same task.

Accordingly, the present invention aims to manage battery consumption in a more efficient manner by controlling the use and use period of sensors when several communicable devices include the same sensor or perform the same task using different sensors.

To achieve the above objects, according to an embodiment of the present invention, a method for controlling a sensor by a mobile device, the method comprising: executing an application performing a task; obtaining first sensor data using a first sensor to perform the task; receiving second sensor data obtained using a second sensor of at least one communicably connected external device; comparing the first sensor data with the second sensor data; and when the first sensor data is replaceable with the second sensor data, controlling an operation of the first sensor and the second sensor according to a battery state of the mobile device and the external device.

According to an embodiment of the present invention, wherein the controlling the operation of the first sensor and the second sensor includes disabling the first sensor and using the second sensor data of the second sensor.

According to an embodiment of the present invention, the method further comprising: periodically enabling the disabled first sensor to periodically compare the first sensor data with the second sensor data; and periodically controlling driving of the first sensor and the second sensor according to a result of periodically comparing the first sensor data with the second sensor data.

According to an embodiment of the present invention, the method further comprising: when receiving, from the external device, a first state change signal indicating occurrence of a state change affecting the second sensor data, enabling the first sensor to use the first sensor data.

According to an embodiment of the present invention, the method of further comprising: obtaining first task data using the first sensor data; obtaining second task data using the second sensor data; comparing the first task data with the second task data; and when the first task data is replaceable with the second task data, controlling an operation of the first sensor and the second sensor according to the battery state of the mobile device and the external device.

According to an embodiment of the present invention, the method of further comprising: when the second sensor data is used to perform the task, compensating for at least one of a time difference, phase difference, frequency difference, and amplitude difference of the second sensor data.

According to an embodiment of the present invention, wherein the battery state includes information on at least one of a total battery capacity of each of the mobile device and the external device, a remaining battery capacity, a recharge pattern, a battery remaining capacity variation state, at least one factor affecting a battery, a recharge frequency, a recharge pattern, and a recharge circumstance.

According to an embodiment of the present invention, wherein the comparing a pattern of the first sensor data with a pattern of the second sensor data is performed referring to at least one of a time difference, a phase difference, a frequency difference, and an amplitude difference.

According to an embodiment of the present invention, wherein the controlling the operation of the first sensor and the second sensor includes disabling the second sensor and using the first sensor data of the first sensor.

According to an embodiment of the present invention, wherein, when receiving a second state change signal indicating that obtaining the second sensor data in the external device is possible, the comparing the first sensor data with the second sensor data is performed by receiving the second sensor data.

According to an embodiment of the present invention, the method of further comprising: providing a user interface (UI) providing at least one of a target device indicator indicating the mobile device and the external device, a task indicator, a sensor data indicator, a task data indicator, and a sensor data indicator and task data window.

According to an embodiment of the present invention, wherein the first state change signal further includes at least one of GPS (Global Positioning System) information of the external device, signal strength information according to a short-range communication connection, and command input information on the external device.

According to an embodiment of the present invention, wherein, when a pattern of the first sensor data and a pattern of the second sensor data are similar as being within a predetermined threshold range within a predetermined time interval, the first sensor data is determined as replaceable with the second sensor data.

To achieve the above objects, according to an embodiment of the present invention, a mobile device comprising: a communication unit configured to communicate with an external device; a first sensor configured to sense a state and a state change in the mobile device or an external environment; a memory unit configured to store digital data; and a processing unit configured to control the communication unit, the first sensor, and the memory unit and execute an application to perform a task, wherein the mobile device: obtains first sensor data using the first sensor to perform the task; receives second sensor data obtained using a second sensor of at least one communicably connected external device; compares the first sensor data with the second sensor data; and when the first sensor data is replaceable with the second sensor data, controls an operation of the first sensor and the second sensor according to a battery state of the mobile device and the external device.

According to an embodiment of the present invention, wherein the mobile device disables the first sensor and uses the second sensor data of the second sensor.

According to an embodiment of the present invention, wherein the mobile device: periodically enables the disabled first sensor to periodically compare the first sensor data with the second sensor data; and periodically controls driving of the first sensor and the second sensor according to a result of periodically comparing the first sensor data with the second sensor data.

According to an embodiment of the present invention, wherein when receiving, from the external device, a state change signal indicating occurrence of a state change affecting the second sensor data, the mobile device enables the first sensor to use the first sensor data.

According to an embodiment of the present invention, wherein the mobile device: obtains first task data using the first sensor data; obtains second task data using the second sensor data; compares the first task data with the second task data; and when the first task data is replaceable with the second task data, controls an operation of the first sensor and the second sensor according to the battery state of the mobile device and the external device.

To achieve the above objects, according to an embodiment of the present invention, a method for controlling a sensor by a mobile device, the method comprising: executing an application performing a task; obtaining first sensor data using a first sensor and obtaining first task data based on the obtained first sensor data; obtaining second task data based on second sensor data obtained using a second sensor of at least one communicably connected external device; comparing the first task data with the second task data; and when the first task data is replaceable with the second task data, controlling an operation of the first sensor and the second sensor according to a battery state of the mobile device and the external device.

To achieve the above objects, according to an embodiment of the present invention, wherein the controlling the operation of the first sensor and the second sensor includes disabling the first sensor and using the second sensor data of the second sensor.

BRIEF DESCRIPTION OF THE DRAWINGS

The accompanying drawings are provided herein for a better understanding of the present invention, and together with the detailed description of the principle of the present invention, show embodiments of the present invention.

FIG. 2 is a view illustrating a method for controlling the use of sensors of mobile devices according to an embodiment of the present invention.

FIG. 3 is a view illustrating a method for controlling the use of sensors of mobile devices according to another embodiment of the present invention.

FIG. 4 is a view illustrating a method for controlling the use of a sensor according to another embodiment of the present invention.

FIG. 10 illustrates a method for comparing and compensating for sensor data according to an embodiment of the present invention.

DETAILED DESCRIPTION

Preferred embodiments of the present invention are described in detail, examples of which are shown in the accompanying drawings. The following detailed description taken in conjunction with the accompanying drawings are merely for purposes of describing preferred embodiments of the present invention rather than showing only embodiments that may be implemented according to embodiments of the present invention. The following detailed description includes details for a better understanding of the present invention.

Most of the terms used herein are ones commonly used in the field to which the present invention pertains, but some terms may be ones arbitrarily chosen and their definitions are given in the following detailed description. Accordingly, the present invention should be appreciated based on intended definitions of the terms but rather than the terms themselves.

As used herein, the term "mobile device" is used to mean any movable electronic device including various wearable devices worn by a user as well as electronic devices such as laptop computers, tablet PCs, smartphones, phablets, or smart tumblers. The term "wearable device" means various electronic devices that may be worn by a user, such as smart glasses, smartwatches, smart rings, or smart bracelets. Although the mobile device is described herein for example, the operation of the present invention is not necessarily limited to the mobile device, and the scope of the present invention may include various electronic devices that may carry out embodiments of the present invention.

Figure 1:
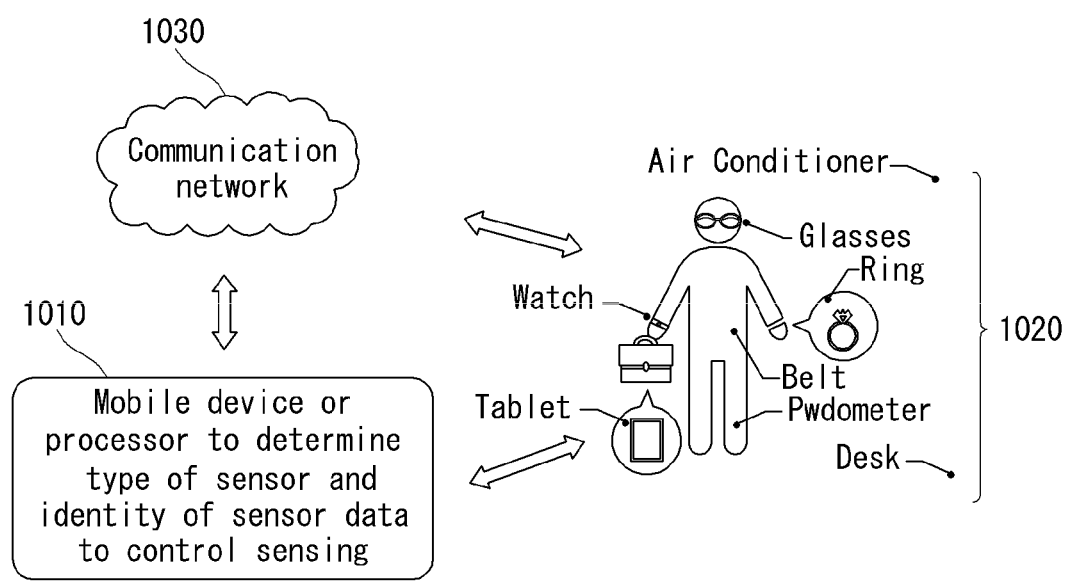
FIG. 1 illustrates a sensing control system according to an embodiment of the present invention.

FIG. 1 illustrates a sensing control system according to an embodiment of the present invention.

Referring to FIG. 1, the sensing control system includes a mobile device 1010, various electronic devices 1020 communicating with the mobile device, and a network 1030 that plays a role as a communication medium between the mobile device 1010 and the external electronic devices 1020.

The mobile device 1010 includes at least one sensor and processing unit. The mobile device 1010 may communicate with various external electronic devices 1020 communicably connected. The sensing of the mobile device may be controlled by an application. In such case, the application may be stored in a memory and driven by the processing unit. Accordingly, it may be described as performed by the processing unit. The processing unit may also be denoted as a computing unit or control unit. The mobile device 1010 may determine the type of sensors included in the mobile device 1010 and the external devices 1020 or identity of data sensed by the sensors to determine the weight of sensing by the mobile device 1010 and the external devices 1020.

The external electronic devices 1020 may include sensors and various electronic devices that may communicate with the mobile device 1010 through the network 1030. For example, the external electronic devices 1020 as shown in FIG. 1 may include a smartwatch, a tablet PC, an air conditioner, glasses, a smart ring, a belt, a pedometer, a smart desk, etc. Such external electronic devices 1020 may include at least one sensor and may be controlled to perform sensing together with the mobile device 1020 depending on the type of sensors or identity of sensor data.

The network 1030 denotes various communication networks that may communicate electronic data wiredly or wirelessly. For example, the network 1030 denotes a communication system using various communication protocols, such as the Internet, local area network (LAN), wireless local area network (WLAN), wide area network (WAN), wireless fidelity (Wi-Fi), 3G, 4G, long term evolution (LTE), Bluetooth, NFC, or Zigbee or combinations thereof, but not limited thereto.

Hereinafter, it is assumed that the mobile device is communicably connected with the external devices via the network. Hereinafter, among the plurality of mobile devices, the device 1010 that controls the use of sensor, e.g., depending on the battery state, may be denoted as a controlling device. The controlling device may correspond to devices providing sensor data using sensors or a separate device connected with the devices via a network to control the devices.

FIG. 2 is a view illustrating a method for controlling the use of sensors of mobile devices according to an embodiment of the present invention.

As shown in FIG. 2, the user may carry or wear devices A to D, and the devices A to D may correspond to portable devices such as smartphones or various wearable devices. Although FIG. 2 shows that device A is a smartphone, device B is a smartwatch, device C is a smart band, and device D is a smart necklace, the present invention is not limited to the type of the devices.

As shown in FIG. 2(a), each device may include the same sensor. That is, devices A to D each may include a speed measuring sensor. In such case, when performing a particular task of measuring speed, each device may use its own speed measuring sensor. However, in such case, they end up overlappingly using the sensors to collect overlapping data. Thus, the system corresponding to the group of devices wastes resources. Accordingly, in such scenario, the controlling device of the system may control the use of sensors according to a particular reference. According to the present invention, it may control the use of the sensors by particularly referring to the battery state of the devices as an example of the particular reference.

As shown in FIG. 2(b), each device may have a different battery state. In FIG. 2(b), device A may have a battery capacity of 1000, device B a battery capacity of 300, device C a battery capacity of 500, and device D a battery capacity of 200. The battery capacities are relative values and are proposed as above as an embodiment. In such case, the controlling device may perform control so that only the device having the largest battery capacity (device A) may be used. In such a manner, the present invention may maximize the use time of each device while minimizing the resource waste that may occur when the plurality of devices overlappingly use the sensors.

FIG. 3 is a view illustrating a method for controlling the use of sensors of mobile devices according to another embodiment of the present invention.

As shown in FIG. 3, the user may carry or wear devices A and B, and such devices may correspond to portable devices such as smartphones or various wearable devices. FIG. 3 shows that device A is a smartphone and device B is a smartwatch, for example.

As shown in FIG. 3(a), each device may have a different battery capacity. For example, device A may have a battery capacity of 10, and device B may have a battery capacity of 100. The battery capacities are relative values and are proposed as above as an embodiment. In such case, the use frequency of the two devices may be controlled depending on the battery capacities.

FIG. 3(b) shows an embodiment of a method for controlling the use frequency of global positioning system (GPS) sensor when performing a position tracking task using the two devices. As shown in FIG. 3(b), the controlling device may control device A and device B so that the period of measurement is twice per minute for device A, 100 times per minute for device B depending on the difference in battery capacity. Although FIG. 3 shows an embodiment to raise the use frequency of the sensor of the device with a larger battery capacity, the controlling device may control the use of sensor considering various battery conditions as well as simply comparing the battery capacities.

FIG. 4 is a view illustrating a method for controlling the use of a sensor according to another embodiment of the present invention.

FIG. 4 shows a method for controlling the sensing by devices including illuminance sensors. First, as shown in FIG. 4(a), devices 1 (ID1) to device 4 (ID4) respectively include illuminance sensors that may respectively measure the illuminances at times T1 and T2 in unit of cd (candela). As shown in FIG. 4(a), the illuminance measured by device 1 (ID1) is 30cd at T1 and 120cd at T2, the illuminance measured by device 2 (ID2) 120cd at T1 and 200cd at T2, the illuminance measured by device 3 (ID3) 130cd at T1 and 210cd at T2, and the illuminance measured by device 4 (ID4) 10cd at T1 and 50cd at T2.

As shown in FIG. 4(a), whether the sensor is used or the use frequency of sensor cannot be controlled only with the type of the sensors being the same. The controlling device should control only sensors included in devices that may perform a task when controlling the sensors. In the case shown in FIG. 4(a), the devices having similar sensor data among the devices are devices 2 and 3. Accordingly, the controlling device may control the use of illuminance sensors of devices 2 and 3.

FIG. 4(b) shows power amounts of devices 1 (ID1) to 4 (ID4). In FIG. 4(b), the power amount of device 1 is 500, the power amount of device 2 is 1000, the power amount of device 3 is 200, and the power amount of device 4 is 300. In an embodiment, when the sensor data from devices 1 to 4 are similar, the controlling device may optimize the use of sensors in the system and power consumption efficiency in such a manner as to increase the frequency of sensing of the device with the highest power amount or the highest remaining power amount (device 2) while decreasing the sensing frequency of the other devices. In another embodiment, as shown in FIG. 4(a), when only devices 2 and 3 may replace the results of sensing, it may optimize the use of sensors in the system and power consumption efficiency in such a manner as to increase the frequency of sensing of the device with the higher power amount or the higher remaining power amount among the two devices while decreasing the sensing frequency of the other device.

In another embodiment, the controlling device may control the weight of illuminance sensing depending on locational features. When location sensors are used and the devices are positioned within a particular distance, the sensing frequency between the devices may be adjusted to minimize resource waste.

Figure 5:
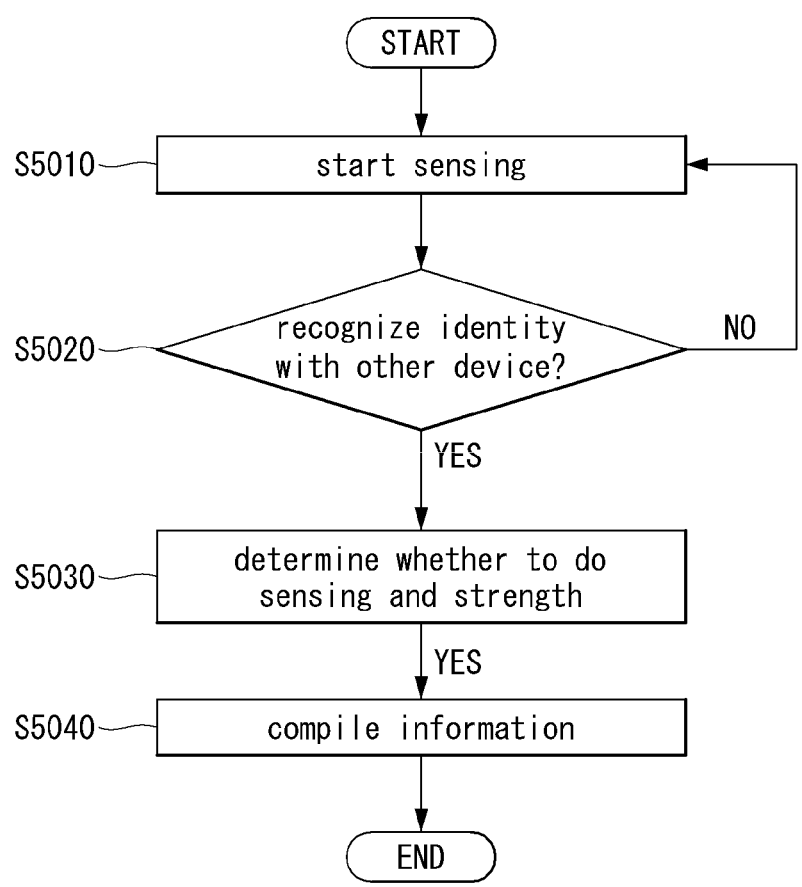
FIG. 5 is a flowchart illustrating a method for controlling a sensor according to an embodiment of the present invention.

FIG. 5 is a flowchart illustrating a method for controlling a sensor according to an embodiment of the present invention.

FIG. 5 shows a method for controlling sensors in which a controlling device increase resource use efficiency by controlling its own sensor and sensors of other devices communicably connected with the controlling device.

The controlling device starts sensing (S5010). The controlling device may start sensing to perform a particular task and may collect sensor data. In this specification, the term "sensor data" may mean data collected using at least one sensor and may correspond to data transmitted from a sensor to a processing unit or data obtained by processing a sensor signal received by a processing unit. The sensor data may be data received from one or more sensors.

The controlling device may recognize the identity with other device (S5020), and if identity is present, may determine whether to sense or a sensing frequency (S5030). The controlling device may recognize the identity with external devices through various references. An embodiment for recognizing identity is as follows:

1) When the controlling device and the external device are positioned within a predetermined distance 2) When the sensor data by the controlling device and the sensor data by the external device have similar values/patterns for a predetermined time 3) When the external device includes the same or similar type of sensor to the controlling device 4) When the external device and the controlling device are set to be the same device An embodiment for determining whether to sense and sensing frequency is as follows:

1) Perform sensing with a device that may best perform a task (e.g., when the sensing value has a higher accuracy, when the sensing value has a higher variation or when the sensing value is closer to the overall average)

2) Determine sensing frequency depending on the remaining battery capacity (for example, reduce sensing frequency as battery capacity decreases)

3) Determine depending on the past battery recharge frequency

4) Determine by the position of devices

5) Determine by user settings or consider a combination of the above-described references Lastly, the controlling device may perform a task by combining the sensor data (sensor information) obtained through the sensors of the plurality of devices (S5040).

Figure 6:
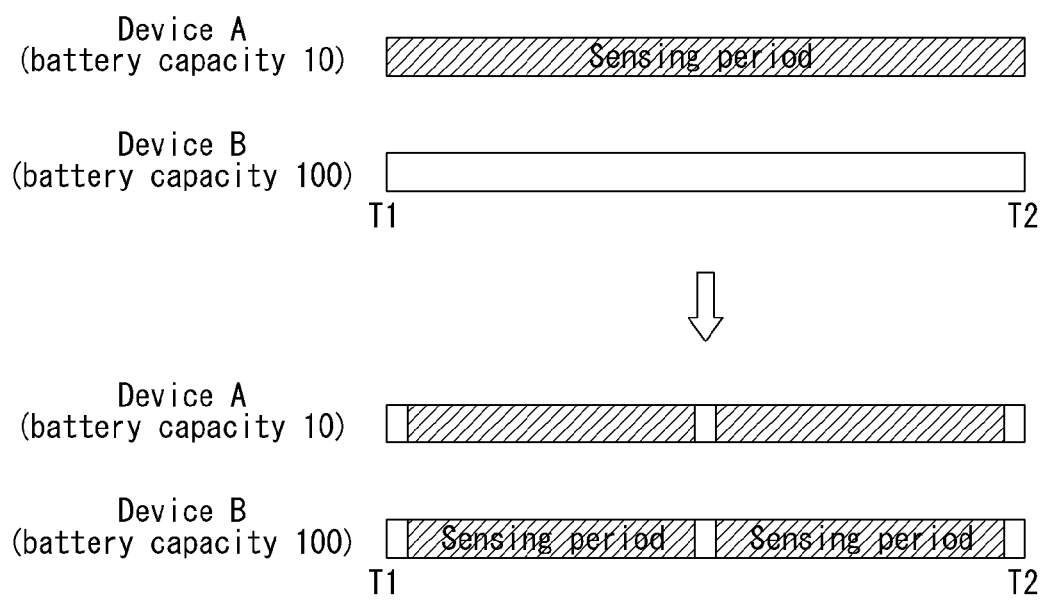
FIG. 6 illustrates a method for controlling a sensor according to an embodiment of the present invention.

FIG. 6 illustrates a method for controlling a sensor according to an embodiment of the present invention.

FIG. 6 shows a method for controlling the use of sensors of a controlling device and an external device, wherein the controlling device is device A, and the external device is device B. However, when the controlling device controls a plurality of devices as described above, devices A and B may correspond to controlled devices.

In FIG. 6(a), device A is fully in charge of sensing, and device B does not perform sensing. However, since the remaining battery capacity of device A is 10, and the remaining battery capacity of device B is 100, when a task is conducted in such a manner, device A would be short of battery and turn off soon. Such situation would not be favored to the user. Accordingly, the controlling device may control devices A and B as described above in connection with FIG. 5.

As shown in FIG. 6(b), when the sensor data of device A and the sensor data of device B have identity, that is, when the sensor data of device A is replaceable with the sensor data of device B, the controlling device may reduce the period of sensing of device A while increasing the period of sensing of device B. The controlling device may receive sensor data mostly from device B. Such reception of sensor data may be performed by real-time streaming depending on the task or data within a particular period may be received at once. Such control of sensors enables the operation time of device A to be increased while enabling the task to be done stably using the sensing data from device B.

The controlling device may disable the sensor of device A and enable the sensor of device B so that the controlling device may use only the sensor of device B. Further, the controlling device may use the sensor of device B and periodically enable the sensor of device A so as to periodically monitor whether the sensor data from device B is replaceable with the sensor data from the device A. The distribution of sensing of device A and device B may be set differently depending on the battery state.

The above-described recognition of identity between the devices may be conducted by comparing sensor data from the devices. For example, particular devices may be communicably connected to communicate device identification information. The controlling device may recognize predetermined particular devices as devices whose sensor data may be replaceable using the identification information. The controlling device may cover more devices and more various circumstances by determining whether the sensor data may be replaceable by comparing the sensor data from the devices. Further, the controlling device may determine whether to control sensors by comparing task data obtained using the sensor data as well as the sensor data. Hereinafter, such methods are described in further detail.

Figure 7:
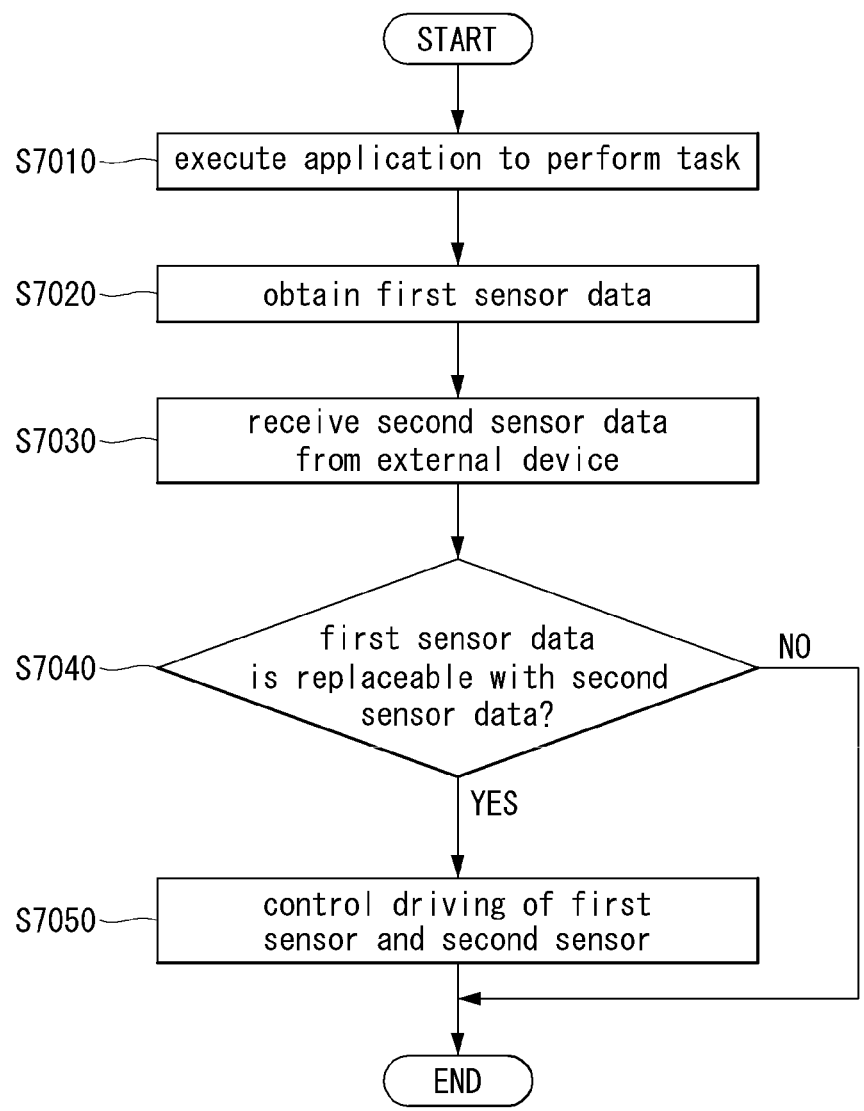
FIG. 7 illustrates a method for controlling a sensor of a mobile device according to an embodiment of the present invention.

FIG. 7 illustrates a method for controlling a sensor of a mobile device according to an embodiment of the present invention.

FIG. 7 shows a detailed embodiment adding/supplementing the embodiment of FIG. 5.

A particular function of a mobile device may be run by an application. As used herein, the term "application" denotes various programs or electronic data run on a mobile device to perform a particular task. When the application is executed, the application may collect sensor data by driving a sensor necessary to perform a task. Also, the application may receive and process data of a sensor operating.

First, the mobile device may execute the application performing the task (S7010). The application may be started by a particular trigger event or may be executed by the user. In an embodiment, the task may be a task to collect the amount of workout and/or consuming calorie information and displaying, as an example.

The mobile device may obtain first sensor data using a first sensor used to perform a task (S7020). The mobile device may obtain sensor data using at least one sensor for performing the task. The sensor data may denote data received from a sensor or a set of data received from a plurality of sensors. Accordingly, the first sensor denotes at least one sensor necessary to perform the task, and the first sensor data denotes data measured using at least one sensor.

The mobile device may receive second sensor data from an external device (S7030). The mobile device may be communicable connected/paired with at least one external device. The mobile device may receive the second sensor data obtained by the communicably connected external device using the second sensor. The second sensor may denote at least one sensor, and the second sensor data may denote data measured using at least one sensor. The mobile device may receive the second sensor data from the external device when communicably connected/paired with the external device or when the corresponding application is executed. Further, the mobile device, when receiving a state change signal from the external device, may receive the second sensor data to determine whether there is overlapping sensing. The state change signal may indicate a state change by which the external device may offer the second sensor data.

More specifically, according to the present invention, the state change signal may denote a state change in the device related to overlapping sensing. The state change signal may be transmitted/received when the device is recognized as worn by the user or when a sudden change occurs in related data values while a particular task is being performed. For example, the state change signal may be transmitted/received when the device is recognized as worn by the user through sensing or when the user is recognized as departing from the device, or when the illuminance value turns about 0 while an illuminance sensing task is conducted, or when the illuminance value is suddenly decreased (e.g., when a wearable device is put in the pocket), or when the workout-related sensor value suddenly becomes 0 while walk is measured for measuring calorie.

The mobile device may compare the first sensor data with the second sensor data to determine whether the first sensor data and the second sensor data may be replaceable with each other (S7040).

According to the present invention, the mobile device determines the replaceability of current sensor data rather than merely determining whether there is compatibility between devices or the identity of sensors. A method for determining whether the sensor data may be replaceable is described below. When the first sensor data and the second sensor data have consistent or similar patterns within a particular time period, the mobile device may determine that the first sensor data is replaceable with the second sensor data. Whether the data may be replaceable may be expressed as whether there is overlapping sensing in the present disclosure. That is, the mobile device may determine whether the mobile device and the external device overlappingly perform sensing (S7040). As described above, when the pattern of the first sensor data and the pattern of the second sensor data are similar within a predetermined threshold range within the predetermined time interval, the first sensor data and the second sensor data may be determined as replaceable with each other.

The mobile device, when the first sensor data is replaceable with the second sensor data, controls the operation of the first sensor and the second sensor based on the battery state of the mobile device and the external device (S7050). The mobile device may control the operation of the sensors considering various battery states as described above in connection with FIGS. 2 to 6.

The mobile devices may cause frequent changes in operation states. For example, although using the sensor of the smartphone with a longer remaining battery capacity of the smartwatch and the smartphone to measure the user's walk, the user may put the smartphone at a fixed position at a certain time. In such case, the sensor used should be changed to the sensor of the smartwatch to measure the user's walk.

To that end, the mobile device may periodically enable the device that has been disabled upon control of the sensor to perform comparison of the sensor data. The mobile device may periodically control the operation of the first sensor and the second sensor based on the periodic comparison of the sensor data. Accordingly, the mobile device may conduct a task corresponding to the state changes in the mobile device and the external device. In other words, the mobile device may periodically compare the sensor data to periodically determine the replaceability, in order to minimize a task failure or sensing missing due to a sudden state change.

The above-described steps of receiving (S7030) the second sensor data and determining (S7040) whether the first sensor data and the second sensor data may be replaceable may also be denoted as syncing between the mobile device and the external device. The executing application may offer a sync UI (User Interface), and upon entry of a sync execution by the user, the mobile device may perform the above-described steps (S7030 and S7040).

Hereinafter, a method for determining whether the first sensor data and the second sensor data may be replaceable with each other is described in further detail.

Figure 8:
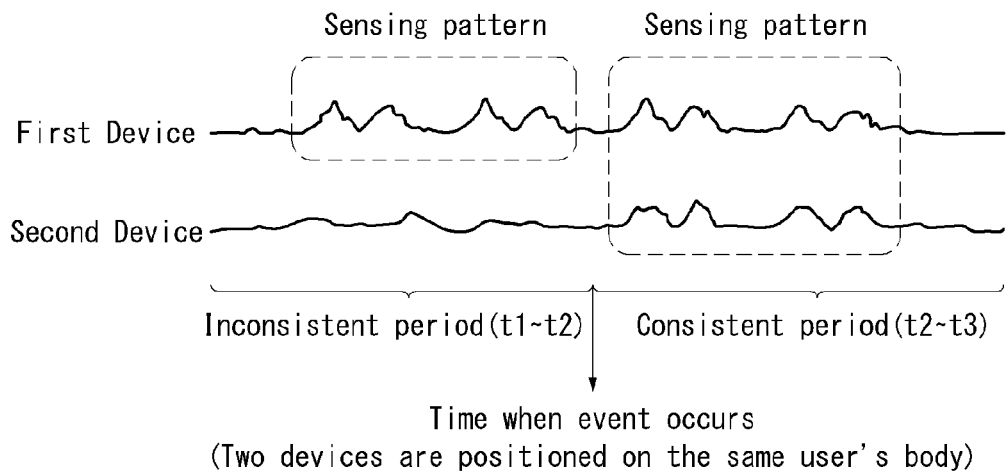
FIG. 8 illustrates a method for comparing sensor data according to an embodiment of the present invention.

FIG. 8 illustrates a method for comparing sensor data according to an embodiment of the present invention.

FIG. 8 shows sensor data of a first device and sensor data of a second sensor data, and the controlling device may determine replaceability by comparing sensor data within a predetermined time period.

In FIG. 8, the first sensor data of the first device and the second sensor data of the second device exhibit inconsistent patterns within the time period of t1 to t2. Accordingly, in this case, since the first sensor data and the second sensor data are not replaceable with each other, the controlling device should use the sensor data of the first sensor data that may perform a task. In FIG. 8, the controlling device may perform a task using first data obtained by operating the first sensor of the first device within the time period of t1 to t2.

In the time period of t2 to t3, the first sensor data and the second sensor data have consistent patterns. The reference by which the data patterns are consistent may be determined based on a predetermined particular threshold range. In such case, since the first sensor data and the second sensor data are replaceable with each other, the controlling device may control the operation of the sensors of the two devices based on the battery state. In other words, when a plurality of sensor data patterns are consistent within a predetermined time period or more, the controlling device may obtain and use sensor data by controlling the sensing of the devices.

In an embodiment, the controlling device may prioritize remaining battery capacity and may first operate the device with a longer remaining battery capacity to obtain sensor data. When the remaining battery capacity is down to a threshold range or is the same, the controlling device may first operate the device whose battery consumes slower to obtain sensor data.

In an embodiment, the controlling device may disable the sensing of the first device or the second device, or may disable the application itself for performing a task or performing a task.

At t2, an event where overlapping sensing starts occurs. Such event may correspond to wearing or turning on an additional mobile device. The event may be recognized by the above-described state change signal. In the case shown in FIG. 8, a wearable device may be worn by the user at t2, and the controlling device receiving the state change signal may determine whether there is overlapping sensing as shown in FIG. 7 and start controlling sensors.

Figure 9:
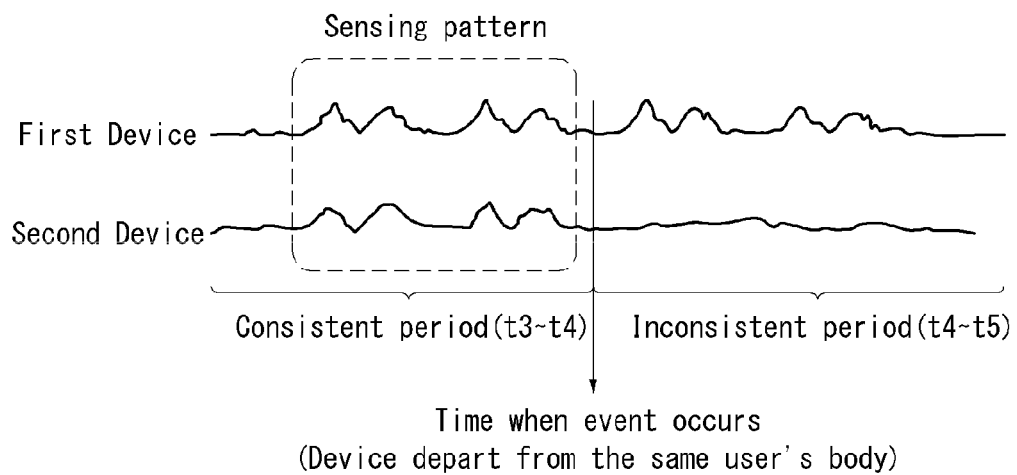
FIG. 9 illustrates a method for comparing sensor data according to an embodiment of the present invention.

FIG. 9 illustrates a method for comparing sensor data according to an embodiment of the present invention.

FIG. 9 shows sensor data of a first device and sensor data of a second sensor data, and the controlling device may determine replaceability by comparing sensor data within a predetermined time period.

In FIG. 9, the first sensor data of the first device and the second sensor data of the second device exhibit consistent patterns within the time period of t3 to t4. Accordingly, since the first sensor data and the second sensor data are replaceable with each other, the controlling device may conduct the above-described sensor operation control.

In the time period of t4 to t5, the first sensor data and the second sensor data have inconsistent patterns. Accordingly, the controlling device should adjust the sensor control. For example, because being unable to use the second sensor data any longer, it should use the first sensor data.

A failure to detect the inconsistency in sensor data at a proper time may end up causing a problem in performing a task. Accordingly, the controlling device may periodically perform a plurality of sensor data within the time period of t3 to t4 as well and may adjust the sensor control when discovering an inconsistency in sensor data. Further, the comparison of sensor data may also be initiated by a trigger signal.

A wearable device may sense whether the user wears the wearable device. For example, in the case of a smartwatch, it may be sensed through the backside or buckle of the smartwatch whether the user wears the smartwatch.

In the case of a mobile device, a sudden state change may be sensed while a task is being conducted. For example, such a situation may occur where no motion/movement is sensed all of sudden while measuring sensor data using a motion/movement sensor. When such state change occurs, the device causing the state change may transmit a trigger signal to the controlling device to report the state change. The trigger signal to inform that a state change affecting the sensor control occurs may be denoted as a state change signal.

In an embodiment, the device transmitting sensor data obtained by using a motion sensor may transmit a state change signal when the motion data suddenly changes. A wearable device, when sensing the user wearing or taking off the wearable device, may transmit a state change signal. The state change signal is a signal indicating the occurrence of a state change affecting the sensor data being transmitted and may be transmitted only when the device transmits sensor data under the sensor control.

Also in FIG. 9, the second device may transmit a state change signal to the controlling device at the time when the event of t4 occurs. In such case, the controlling device may compare the first sensor data with the second sensor data to adjust the sensor control.

In another embodiment, when receiving a state change signal, the controlling device may first change the sensor control to use the first sensor data and then perform the above-described steps, e.g., comparison of sensor data, in order to avoid sensing missing. That is, the controlling device, upon reception of a state change signal of the second device, may enable the first sensor of the first device to immediately use the first sensor data. When performing the sensor control particularly to prevent overlapping sensing, the controlling device, upon reception of the state change signal, may enable the sensors of all the available devices to collect sensor data and may then perform again the above-described operation of determining whether there is overlapping sensing.

FIG. 10 illustrates a method for comparing and compensating for sensor data according to an embodiment of the present invention.

The controlling device may compare a plurality of sensor data, and if there are sensor data replaceable, the controlling device may control the use of sensor based on the battery state. However, when comparing or replacing sensor data, the sensor data or changing patterns may need to be compensated for.

FIG. 10(a) shows a case where there is a time delay between sensor data. For example, the first device may be a wearable device worn on the user's left hand, and the second device may be a mobile device in the user's right pants pocket. In such case, in motion sensing according to the user's walk, a time delay of t_d may occur in the sensor data of the first device and the second device. In an embodiment, t_d may be 200 ms. This is based on a time difference between the user's wrist movement and walk, and even though the first sensor data and the second sensor data do not have the same pattern when measuring the user's walk, they should be determined as replaceable.

In the case shown in FIG. 10(a), the controlling device may compare the sensor data by compensating for the time delay. Further, the controlling device, when replacing and using the sensor data, may compensate for the time delay. For example, when compensating for the second sensor data based on the first sensor data, the time delay of t_d may be removed from the second sensor data, and the second sensor data may be synced in timing with the first sensor data.

FIG. 10(b) shows a case where there is an amplitude gap between sensor data. For example, the first device may be a wearable device worn on the user's left hand, and the second device may be a mobile device in the user's bag. In such case, the user's movement may be sensed from both devices, but the size of movement sensed from the second device may be smaller than the size of movement sensed from the first device. However, if the task does not significantly rely on the amplitude and sensitivity to amplitude of the sensor data, the first sensor data may be replaced with the second sensor data.

In the case shown in FIG. 10(b), the controlling device may compare the sensor data by compensating for the amplitude, and even when replacing and using the sensor data, may compensate for the amplitude. For example, when compensating for the second sensor data based on the first sensor data, the second sensor data may be multiplied by $a1/a2$.

In the above-described embodiments, a method for replacing sensor distributed antenna has been described. However, the sensors performing a task should not be inevitably the same or of the same type. In an embodiment, when a task performed by an application is a task of providing calorie consumption according to an activity within a particular period, the calorie consumption may be measured/computed using various sensors.

In an embodiment, the device may compute calorie data using measured heartbeat data. In other words, the device may generate calorie data from sensor data measured using, e.g., an electrocardiogram (ECG) sensor, an electroencephalogram (EEG) sensor, a photo plethysmography (PPG) sensor, an SPO2 sensor, a blood pressure sensor, or a pulse sensor.

In another embodiment, the device may compute calorie data using a motion sensor. The device may generate calorie data from sensor data measured using an acceleration sensor, a geo-magnetic sensor, or a GPS (Global Positioning System) sensor.

In another embodiment, the device may also compute calorie data from image data. The device may generate calorie data from sensor data obtained using a camera of, e.g., a smartphone, smart glasses, or smartwatch. The camera may be classified as an image sensor, and sensor data obtained through the camera may be image data.

As such, when a task may be performed even using heterogeneous sensor data, task data computed from the sensor data, rather than comparing the sensor data, may be compared to perform the sensor control according to the present invention. The task data, when a particular task is conducted through a corresponding application, denotes task-related data computed from the sensor data. In the above-described embodiments, the task data may be consumed calorie data such as a calorie value and variation in calorie value. Hereinafter, a method for performing sensor control using task data is described in greater detail.

Figure 11:
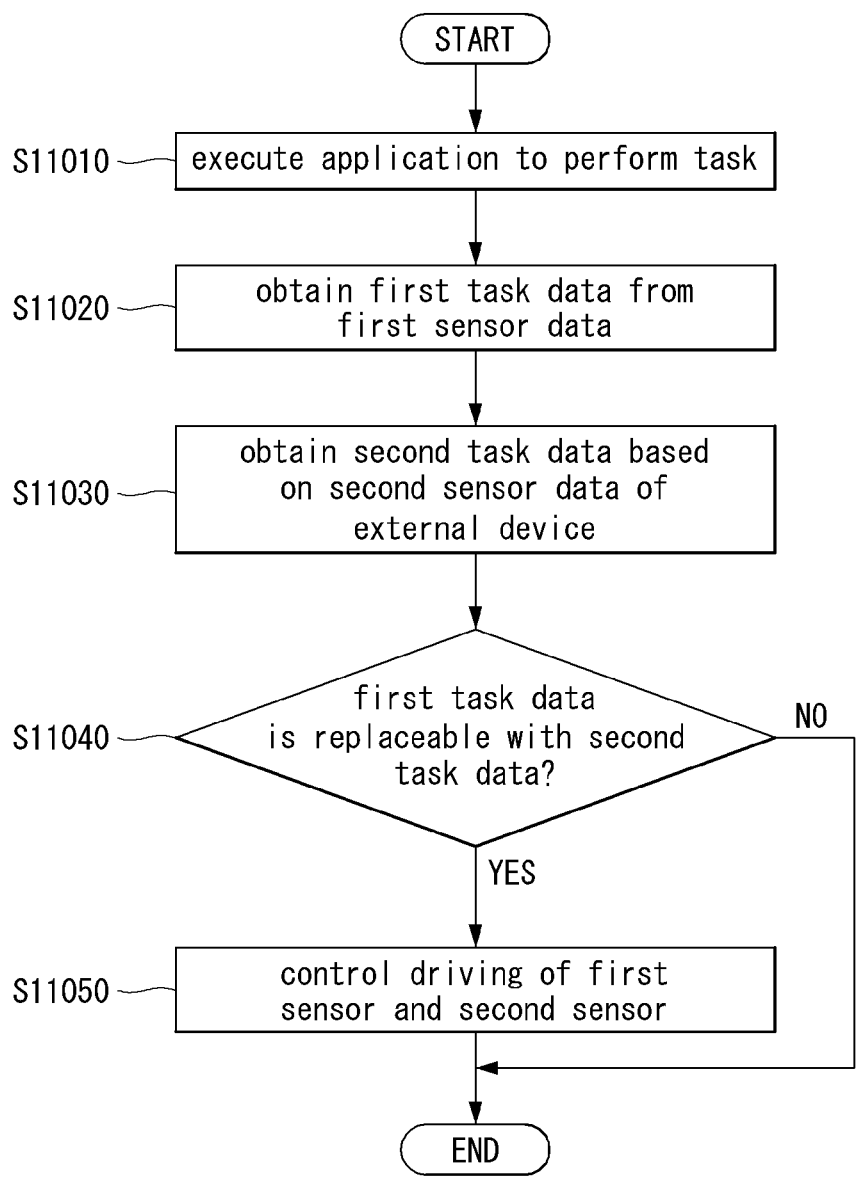
FIG. 11 illustrates a method for controlling a sensor of a mobile device according to another embodiment of the present invention.

FIG. 11 illustrates a method for controlling a sensor of a mobile device according to another embodiment of the present invention.

FIG. 11 shows an expanded embodiment of the embodiment of FIG. 7 and the same steps are not repeatedly described. In the case shown in FIG. 11, the steps S11020 to S11040 may be performed differently from those shown in FIG. 7. FIG. 11 shows an embodiment of performing sensor control based on task data obtained from sensor data in addition to performing the sensor control based on the sensor data.

The mobile device may process first sensor data to obtain first task data (S11020). For example, in order to perform a task of providing a calorie variation, the mobile device may obtain motion sensor data (first sensor data) using a motion sensor (first sensor) and may process the motion sensor data (first sensor data) to obtain calorie data (first task data).

The mobile device may obtain second task data from second sensor data of an external device (S11030). For example, the external device may be a smartwatch and may obtain ECG data (second sensor data) using an ECG sensor (second sensor). The mobile device may receive the ECG data from the external device and may process the ECG data to compute calorie data. Or, the mobile device may receive calorie data computed from the external device. The obtained calorie data may correspond to the second task.

The mobile device may compare the first task data with the second task data to determine whether the first task data and the second task data may be replaceable (S11040). The mobile device may determine whether the first task data and the second task data may be replaceable in a similar manner to the above-described method for comparing/determining the first sensor data and the second sensor data. When the patterns or pattern variations in the first task data and the second task data are consistent or similar within a predetermined range, the mobile device may determine that the task data may be replaceable. As described above, when the pattern of the first task data and the pattern of the second task data are similar within a predetermined threshold range within a predetermined time interval, the first task data and the second task data may be determined as replaceable.

The mobile device, when the first task data and the second task data are replaceable, controls the operation of the first sensor and the second sensor based on the battery state of the mobile device and the external device (S11050). The method for controlling the sensors by the mobile device has been described in the other parts of the disclosure.

Hereinafter, a method for determining whether the first task data and the second task data may be replaceable and controlling the use of sensor is additionally described. Hereinafter, comparison of task data and sensor control are described with commands. Further, in the following embodiments, the ECG sensor of the smartwatch and the PPG sensor of the smartphone, both, may obtain measured ECG data, and the gyro sensor/acceleration sensor of the smartwatch and the gyro sensor/acceleration sensor of the smartphone all may obtain measured motion data.

1) When a task is performed using a single sensor

---
Compare[kcal(ECG_1),kcal(Gyro_2)]
kcal(ECG_1)=kcal(Gyro_2)
Execute[kcal(Gyro_2)]
---

The controlling device may compare first calorie data (kcal(ECG_1)) obtained from ECG sensor data (ECG_1) of the smartwatch with second calorie data (kcal(Gyro_2)) obtained from the gyro sensor data (Gyro_2) of the smartphone (Compare[kcal(ECG_1),kcal(Gyro_2)]). When the controlling device compares the two calorie data and sense similar patterns or similar values (kcal(ECG_1)=kcal(Gyro_2)) within a predetermined range, this indicates that the first calorie data and the second calorie data are replaceable, and the controlling device may select a sensor to be used to provide calorie information considering the battery state. For example, if the battery consumes relatively more when the ECG sensor of the smartwatch is activated during the time period when calorie information is provided, the controlling device may obtain calorie data using the gyro sensor of the smartphone (Execute[kcal(Gyro_2)]).

2) When a task is performed using a single or multiple sensors

---
Compare[kcal(PPG_1), kcal(Accel_2 + Gyro_2)]
kcal(PPG_1) = kcal(Accel_2 + Gyro_2)
Execute[kcal(PPG_1)]
---

The controlling device may compare first calorie data (kcal(PPG_1)) obtained from PPG sensor data (PPG_1) of the smartwatch with second calorie data (kcal(Accel_2+Gyro_2)) obtained from the acceleration sensor data (Accel_2) and gyro sensor data (Gyro_2) of the smartphone (Compare[kcal(PPG_1), kcal(Accel_2+Gyro_2)]). When the controlling device compares the two calorie data and sense similar patterns or values (kcal(PPG_1)=kcal(Accel_2+Gyro_2)) within a predetermined range, this indicates that the first calorie data and the second calorie data are replaceable, and the controlling device may select a sensor to be used to provide calorie information considering the battery state. For example, the controlling device may enable the PPG sensor of the smartwatch during a time period when calorie information is provided to obtain calorie data (Execute[kcal(PPG_1)]).

Hereinafter, a method for obtaining task data using a plurality of sensors and combining and using the plurality of sensors upon sensor control is described.

3) When a task is performed using a plurality of sensors

Compare[kcal(ECG_1, PPG_2),kcal(Gyro_1, Accel_2)]
Execute[kcal(ECG1, Accel2)] or Execute[kcal(ECG1, Gyro1)]

The controlling device may generate task data using homogeneous sensors of controlled devices. For example, the controlling device may compute calorie data using ECG sensor data (ECG_1) of the first device and PPG sensor data (PPG_2) of the second device and may compute calorie data using gyro sensor data (Gyro_1) of the first device and acceleration data (Accel_2) of the second device and may compare the same.

Even when the use of sensor is controlled as a result of the comparison, the controlling device may control on a per-sensor basis included in the device as described above or heterogeneous sensors may be used in combinations. For example, the controlling device may generate calorie data using the ECG sensor of the first device and the acceleration sensor of the second device (Execute[kcal(ECG1, Accel2)]). That is, the controlling device may obtain measured ECG data through the ECG sensor contacting the skin, distribute the use of sensor to obtain measured motion data through the smartphone, and generate calorie data using the obtained ECG data and motion data. The calorie data may be generated by the controlling device, and the controlling device may be set to be the smartwatch or smartphone depending on the battery state to distribute processing resources.

Or, the controlling device may perform control to obtain sensor data using the ECG sensor of the first device and the gyro sensor of the first device. For example, when the smartphone is placed in the bag, the PPG sensor data of the smartphone might not be obtained, and the acceleration sensor value may have a similar pattern, but the efficiency may be lowered in light of signal strength/accuracy. In such case, the use of the sensor of the smartphone may be disabled, and the ECG sensor and gyro sensor of the smartwatch may be used to perform a task.

Figure 12:
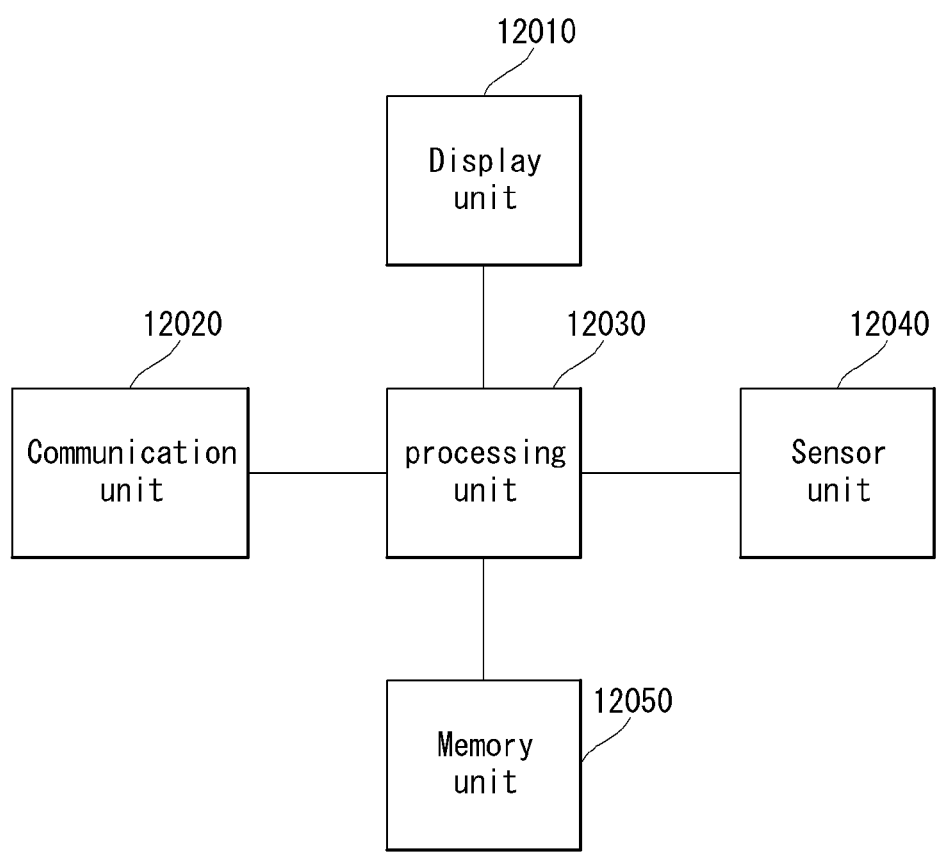
FIG. 12 illustrates a mobile device according to an embodiment of the present invention.

FIG. 12 illustrates a mobile device according to an embodiment of the present invention.

The mobile device shown in FIG. 12 denotes a controlling device and may correspond to various portable devices and wearable devices.

The mobile device includes a display unit 12010, a communication unit 12020, a processing unit 12030, a sensor unit 12040, and a memory unit 12050.

The display unit 12010 provides various types of graphical user interfaces (GUIs). The display unit 12010 may correspond to a display screen and may be provided together with other sensor units. According to an embodiment of the present invention, the display unit 12010 may be omitted.

The communication unit 12020 may be connected to various communication networks to communicate with external devices. According to the present invention, the communication unit 12020 may transmit sensor data or task data to an external device or may receive sensor data or task data from the external device.

The sensor unit 12040 includes at least one sensor and may provide sensor data to the processing unit 12030. The sensor unit 12040 may include at least one of a motion sensor such as an acceleration sensor, a linear acceleration sensor, a gyroscope, a gravity sensor, a rotation vector sensor, a step counter sensor, or a step detector sensor, a position sensor such as an orientation sensor and a proximity sensor, a magnetic field sensor, a geo-magnetic sensor, or an environment sensor such as a temperature sensor, light sensor, pressure sensor, or humidity sensor. The motion sensor, position sensor, and environment sensor may be classified as different types of sensors.

Although the sensor unit 12040 has been shown in one block as shown in FIG. 12, a plurality of sensor units may be provided depending on the type, location, and number of sensors as described above.

The memory unit 12050 may be a volatile/non-volatile memory device and may store various digital data. The memory unit 12050 may store data to perform an application and may store sensor data and task data.

The processing unit 12030 may read/run various digital data stored in the memory unit 12050. Further, the processing unit 12030 may control at least one unit of the display unit 12010, the communication unit 12020, the processing unit 12030, the sensor unit 12040, and the memory unit 12050.

Although not shown in FIG. 12, additional output units may be included in the display unit 12010. The display unit 12010 may be an embodiment of an output unit. The output unit may include a visual feedback output unit, an audio feedback output unit, and a tactile feedback output unit. The visual feedback output unit may correspond to the display unit 12010.

According to the present invention, the processing unit 12030 may communicate with an external device, compare sensor data or task data, and if the data may be replaceable, control the use of sensor. The processing unit 12030 may control other units to perform the above-described methods according to the present invention.

Hereinafter, a user interface of an application performing a method for controlling a sensor according to the present invention is described. Hereinafter, although the user interface is a GUI for the purpose of description, information and feedbacks provided through the GUI may also be provided as voice feedbacks or tactile feedbacks.

Figure 13:
FIG. 13 illustrates a GUI showing sensors/sensing of devices according to an embodiment of the present invention.

FIG. 13 illustrates a GUI showing sensors/sensing states of devices according to an embodiment of the present invention.

Referring to FIG. 13, the first device corresponds to a smartphone, and the second device corresponds to a smartwatch, and the GUI shows the type and state of sensors included/driven by each device. The type of sensors largely includes a motion sensor, a position sensor, and an environment sensor as described above.

In the embodiment shown in FIG. 13, the motion sensor may include an accelerometer, a linear accelerometer, a gyroscope, a gravity sensor, a rotation vector sensor, a significant motion sensor, a step counter, and a step detector, the position sensor may include a game rotation sensor, a geo-magnetic sensor, a magnetic field sensor, an orientation sensor, and a proximity sensor, and the environment sensor may include an ambient temperature sensor, a light sensor, a pressure sensor, humidity sensor, and a temperature sensor.

As shown in FIG. 13, among the motion sensors of the smartphone, the accelerometer, linear accelerometer, gyroscope, gravity sensor, and rotation vector sensor are being driven, among the position sensors, the game rotation sensor, magnetic field sensor, and orientation sensor are being driven, and among the environment sensors, the temperature sensor is being driven. In the case of the smartwatch, the accelerometer, gyroscope, gravity sensor, rotation vector sensor, game rotation sensor, and light sensor are in operation. Accordingly, these six data may be generated under the replaceable overlapping sensing situation. In an embodiment, the mobile device may provide information on interworking devices and sensors used by the devices as shown in FIG. 13.

The mobile device may provide sensing state information on the device as a UI as shown in FIG. 13. The UI may show the interworking devices, sensors included in the devices, and whether the sensors are operated. The UI may also show whether there is overlapping sensing depending on whether the sensors are operated. However, the same or similar sensors being simultaneously operated does not necessarily mean there is overlapping sensing, and information on the overlapping sensing related to the task may be provided through an additional UI as follows.

Figure 14:
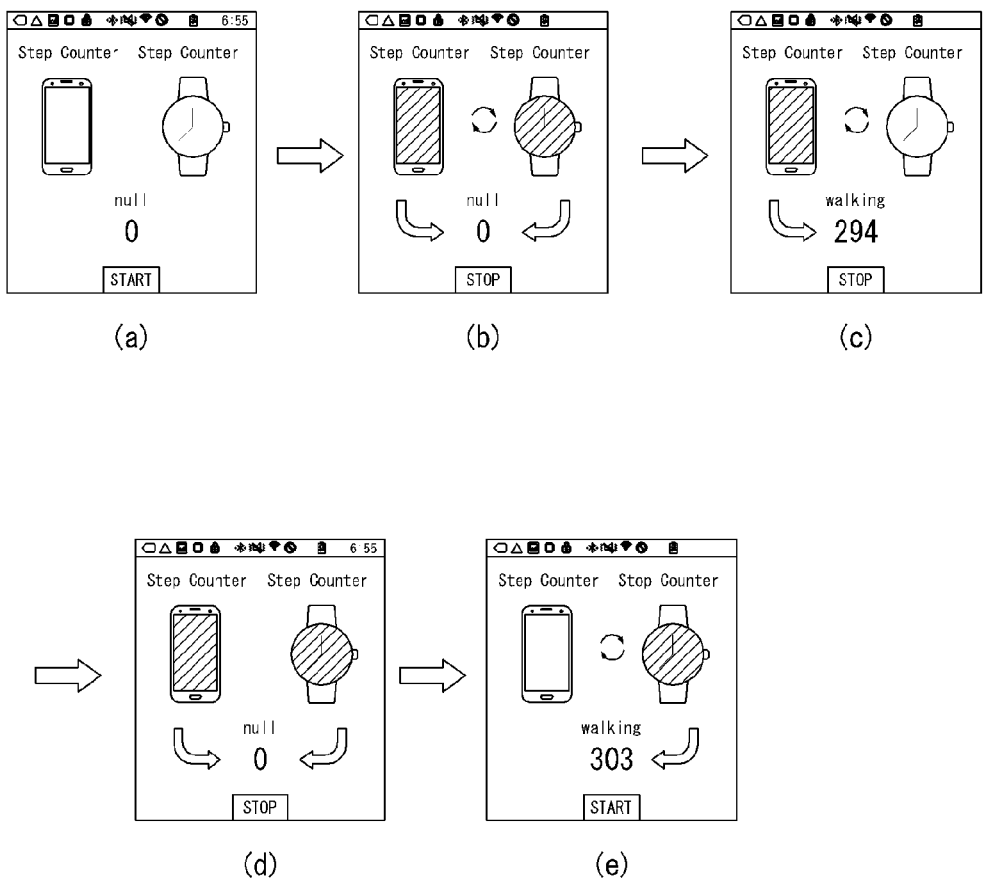
FIG. 14 illustrates a progress of GUIs of an application performing an overlapping sensing control method according to an embodiment of the present invention.

FIG. 14 illustrates a progress of GUIs of an application performing an overlapping sensing control method according to an embodiment of the present invention.

The GUI of FIG. 14 is an embodiment when a task performed is step counting. The GUI of FIG. 14 shows controlled devices (smartphone and smartwatch) that may perform overlapping sensing, states of the controlled devices and sensor data/task data.

FIG. 14(a) shows a GUI provided when the control of overlapping sensing is started. In FIG. 14(a), the GUI shows that the smartphone and smartwatch both execute the step counters. The GUI may show whether sensor control-enabled tasks are executed and the type of tasks on an upper end of the controlled devices as shown in FIG. 14.

In FIG. 14(b), the GUI shows a sync between the smartphone and the smartwatch. In FIG. 14(b), the sync may indicate the operation of receiving sensor data or task data by the controlled devices. When the sync is done, the controlled devices may be displayed by visual effects. In FIG. 14(b), the synced controlled devices may be shown with the emphasis of the same color, and a circular arrow is provided to indicate the sync. However, the sync may also include the operation of determining whether there is overlapping sensing and determining a controlled device to drive the sensor according to an embodiment.

In FIG. 14(c), the GUI shows the use of sensor and sensor data/task data according to the sensing control. In FIG. 14(c), the GUI indicates that the smartphone performs sensing by adding a visual effect to the left-hand smartphone. Further, the GUI shows that the smartphone provides the sensor data or task data '294' and an arrow Here, the data of '294' may be step counter data, and in an embodiment, may correspond to sensor data or task data. The GUI may visually display, on the screen of at least one of the smartphone and the smartwatch, the overlapping sensing state, battery state, type of task, device performing the task, and flow of sensor/task data, together with the shape of the smartwatch and smartphone. Further, the controlling device may selectively/in combination provide a visual, audible, and tactile feedback for information necessary to be known to the user and may induce the use for wearing or carrying the device in connection with the alarm information such as the remaining battery capacity. In this case, sync and device to perform the task may be blocked by the user's input.

The GUI of FIG. 14(d) is the same as the GUI of FIG. 14(b) and this is a GUI redrawn to represent a sequential order. As described above, the controlling device may re-determine whether there is overlapping sensing at predetermined time intervals when sensing a particular event through a state change signal. A GUI re-performing sync periodically or when sensing an event is shown in FIG. 14(d).

FIG. 14(e) illustrates a GUI showing the use of sensor and sensor data/task data according to sensing control as shown in FIG. 14(c). When as a result of the sync the sensing of the smartwatch is sensed but the result of the smartphone sensing is not, the controlling device does not perform control according to overlapping sensing. The controlling device may change the sensing device to the smartwatch that only may perform a task regardless of battery state or task performance efficiency. However, such sensing device may also be determined by the user's input and a UI for determining a sensing device may be additionally provided.

Figure 15:
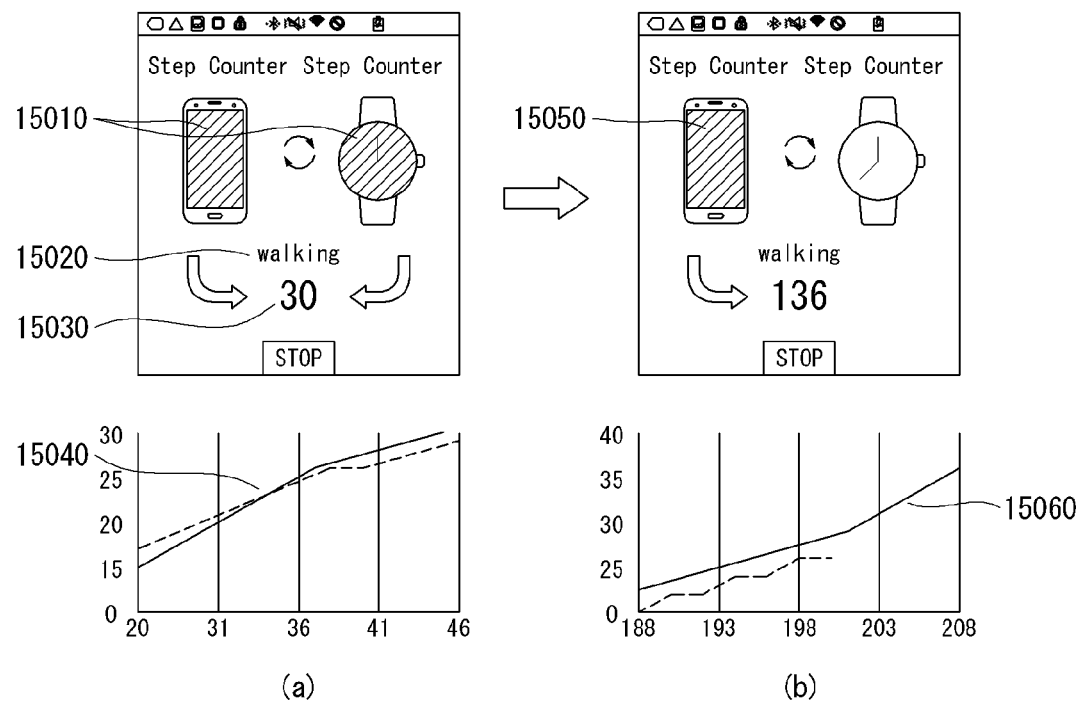
FIG. 15 illustrates a GUI of an application performing an overlapping sensing control method according to an embodiment of the present invention.

FIG. 15 illustrates a GUI of an application performing an overlapping sensing control method according to an embodiment of the present invention.

FIG. 15(a) shows a GUI before sensor control is performed for overlapping sensing after sync, and FIG. 15(b) shows a GUI after sensor control is performed for overlapping sensing.

As shown in FIG. 15(a), the GUI includes a target device indicator 15010, a task indicator 15020, a task data indicator 15030, and a task data window 15040. The task data window 15040 may visually display task data and accumulation/variation in data obtained by controlled devices using sensors.

When the control of overlapping sensing is performed, the GUI shows a device 15050 performing sensing through the target device indicator 15010 as shown in FIG. 15(b). The device to perform sensing may be shown in various manners. The task data window 15060 indicates that only one task data is collected after the control of overlapping sensing.

According to an embodiment of the present invention, the user interface may be provided in various ways from at least one device of the controlling device and the controlled devices. The user interface may provide at least one of shapes of devices, overlapping sensing state between the devices, battery state, task type, device to perform task (selective sensing information), and transmission flow of sensor data/task data. Further, the user interface may provide, selectively/in combination, notification information necessary for the user, through a visual, audible, and tactile feedback, in relation to the posture/way to carry to prevent overlapping sensing and selection of a device for selective sensing. There may be provided a UI that blocks overlapping sensing for the same task or may enter such blockage.

Figure 16:
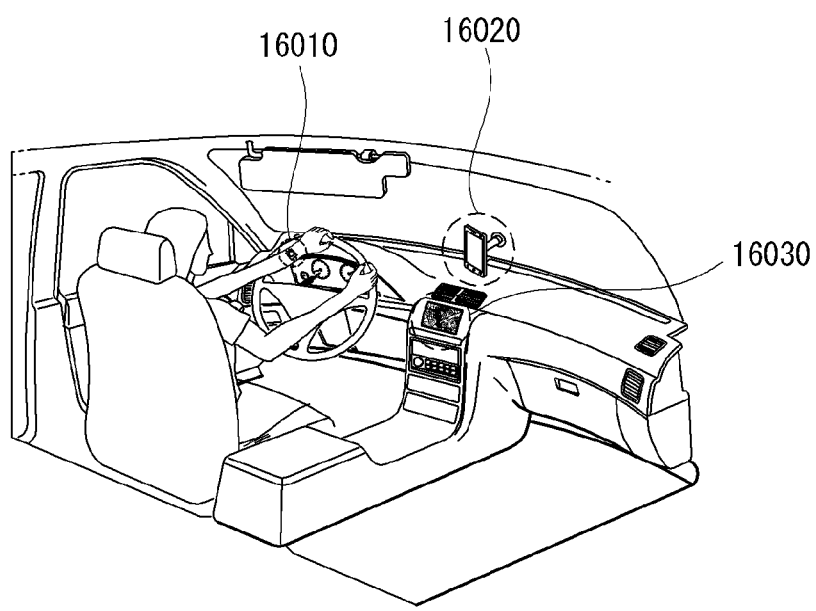
FIG. 16 illustrates a situation where overlapping sensing is addressed according to an embodiment of the present invention.

FIG. 16 illustrates a situation where overlapping sensing is addressed according to an embodiment of the present invention.

The figure shows performing selective sensing according to overlapping sensing between a wearable device 16010 (smartwatch) or mobile device 16020 (smartphone) and a smart car 16030.

A task of overlapping sensing with the smart car may be performed on the device worn or carried by the user. For example, 1) location information through a GPS sensor, 2) image sensor (camera) information from inside the car and HMD image, 3) bio information (authentication or healthcare task-related) from the smartwatch (or HMD) related to user authentication or healthcare task and bio information sensed on the wheel may be overlapping sensed to perform the same or similar application task.

In such case, since the smart car has priority in light of battery condition, as default, the sensor performing the task of the device worn or carried may be disabled or stopped so that it may be performed by the smart car. Thereafter, the sensor data of the smart car may be stored, and when the car stops or its ignition turns off, or when such event occurs when the driver gets out of the car, the sensor data may be delivered to the device 16010 or 16020 worn or carried by the user.

In an embodiment, when the worn or carried device 16010 or 16020 is being wirelessly recharged through the smart car, the overlapping sensing task may be set to be automatically assigned to the smart car. Upon exchange of battery information, battery management information on the smart car may also be exchanged together with the battery information or included in the battery information.

In another embodiment, upon detection of overlapping sensing related to performing the same task, the controlling device may perform control to maintain the overlapping sensing state without switching the overlapping sensing to a selective sensing mode considering the remaining battery and task performance efficiency (accuracy or quick result return). In this case, the selection of maintaining overlapping sensing and circumferential information according to the selection, and its following battery consumption, and results of performing the task according to overlapping sensing may be provided through a display UI.

In determining whether there is overlapping sensing, in addition to the overlapping data of the sensors for the same task, GPS information, signal strength as per short-range communication connection distance, and command input (e.g., a touch, gesture in space, voice input, brainwave input) information on the external digital device while the wearable device is worn may also play a role as a reference to determine the overlapping sensing according to a single/combination of results. In other words, at least one of the GPS information on the external device, information on signal strength as per short-range communication connection, and command input information on the external device may be included in the above-described state change signal.

After exchange of sensor information that may be overlappingly sensed between two devices, if the application of the overlappingly sensible task is not executed on any one device or might not be present in the device. In such case, the controlling device may provide a visual, audible, or tactile guide through UI to automatically execute the application, induce the application to execute, or download the application. Such UI may be required to transfer the task to other device according to the battery state.

According to the present invention, a mobile device may enhance resource use efficiency by preventing overlapping sensing.

Further, according to the present invention, a mobile device may prevent a task failure due to sensor control by comparing patterns of sensor data in order to determine whether current sensor data may be replaced.

Further, according to the present invention, a mobile device may minimize a sensing drop that may occur due to a sudden state change in such a manner as to enable the sensor periodically or when receiving a signal indicating that the state of the sensor is changed even when the sensor is disabled.

Further, according to the present invention, a mobile device may apply a sensing distribution even to different types of sensors by controlling sensing by comparing not only sensor data but also task data obtained from the sensor data.

Further, according to the present invention, a mobile device may adjust the use efficiency of resources more precisely by controlling sensing in such a manner as to combine sensors of different devices as well as to distribute the sensing on a per-sensor basis or on a per-device basis.

Hereinafter, additional effects of the present invention are described in greater detail in connection with embodiments of the present invention.

It is appreciated by one of ordinary skill in the art that various changes and modifications may be made to the present invention without departing from the scope or spirit of the present invention. Accordingly, the present invention is intended to include all variations or modifications to the present invention provided within the following claims and equivalents thereof.

In the disclosure, all of the devices and methods mentioned and described herein may be applied in a supplementary manner.

What is claimed is:

1. A method for controlling a sensor by a mobile device, the method comprising:
    executing an application performing a task;
    obtaining first sensor data using a first sensor to perform the task;
    receiving second sensor data obtained using a second sensor of at least one communication-connected external device;
    comparing a pattern of the first sensor data with a pattern of the second sensor data referring to at least one of a time difference, a phase difference, a frequency difference, and an amplitude difference; and
    when the pattern of the first sensor data is consistent with the pattern of the second sensor data in a predetermined range for a predetermined time interval, disabling the first sensor and using the second sensor data for performing the task according to a battery state of the mobile device and the external device.

2. The method of claim 1, further comprising:
    periodically enabling the disabled first sensor to periodically compare the pattern of the first sensor data with the pattern of the second sensor data; and
    periodically controlling driving of the first sensor and the second sensor according to a result of periodically comparing the pattern of the first sensor data with the pattern of the second sensor data.

3. The method of claim 1, further comprising:
    when receiving, from the external device, a first state change signal indicating occurrence of a state change affecting the second sensor data, enabling the first sensor to use the first sensor data.

4. The method of claim 3, wherein the first state change signal further includes at least one of GPS (Global Positioning System) information of the external device, signal strength information according to a short-range communication connection, and command input information on the external device.

5. The method of claim 1, further comprising:
    obtaining first task data using the first sensor data;
    obtaining second task data using the second sensor data;
    comparing a pattern of the first task data with a pattern of the second task data; and
    when the pattern of the first task data is consistent with and the pattern of the second task data in predetermined range disabling the first sensor and using the second sensor data for performing the task according to the battery state of the mobile device and the external device,
wherein the first sensor and the second sensor are of same types or different types.

6. The method of claim 1, further comprising:
when the second sensor data is used to perform the task, compensating for at least one of a time difference, phase difference, frequency difference, and amplitude difference of the second sensor data.

7. The method of claim 1, wherein the battery state includes information on at least one of a total battery capacity of each of the mobile device and the external device, a remaining battery capacity, a recharge pattern, a battery remaining capacity variation state, at least one factor affecting a battery, a recharge frequency, a recharge pattern, and a recharge circumstance.

8. The method of claim 1, further comprising:
providing a user interface (UI) providing at least one of a target device indicator indicating the mobile device and the external device, a task indicator, a sensor data indicator, a task data indicator, a sensor data indicator and task data window.

9. A mobile device comprising:
a communication unit configured to communicate with an external device;
a first sensor configured to sense a state and a state change in the mobile device or an external environment;
a memory unit configured to store digital data; and
a processing unit configured to control the communication unit, the first sensor, and the memory unit and execute an application to perform a task,
wherein the mobile device:
obtains first sensor data using the first sensor to perform the task;
receives second sensor data obtained using a second sensor of at least one communication connected external device;
compares a pattern of the first sensor data with a pattern of the second sensor data referring to at least one of a time difference, a phase difference, a frequency difference, and an amplitude difference; and
when the pattern of the sensor data is consistent with the pattern of the second sensor data in a predetermined range for a predetermined time interval, disables the first sensor and uses the second sensor data for performing the task according to a battery state of the mobile device and the external device.

10. The mobile device of claim 9, wherein the mobile device:
periodically enables the disabled first sensor to periodically compare the pattern of the first sensor data with the pattern of the second sensor data; and periodically controls driving of the first sensor and the second sensor according to a result of periodically comparing the pattern of the first sensor data with the pattern of the second sensor data.

11. The mobile device of claim 9, wherein when receiving, from the external device, a state change signal indicating occurrence of a state change affecting the second sensor data, the mobile device enables the first sensor to use the first sensor data.

12. The mobile device of claim 9, wherein the mobile device:
obtains first task data using the first sensor data;
obtains second task data using the second sensor data;
compares a pattern of the first task data with a pattern of the second task data; and
when the pattern of the first task data is consistent with the pattern of the second task data in predetermined range, disabling the first sensor and using the second sensor data for performing the task according to the battery state of the mobile device and the external device
wherein the first sensor and the second sensor are of same types or different types.

13. A method for controlling a sensor by a mobile device, the method comprising:
executing an application performing a task;
obtaining first sensor data using a first sensor and obtaining first task data based on the obtained first sensor data;
obtaining second task data based on second sensor data obtained using a second sensor of at least one communicably connected external device;
comparing a pattern of the first task data with a pattern of the second task data referring to at least one of a time difference, a phase difference, a frequency difference, and an amplitude difference; and
when the pattern of the first task data is consistent with the pattern of the second task data in predetermined range, disabling the first sensor and using the second sensor data for performing the task according to a battery state of the mobile device and the external device.

* * * * *